United States Patent
Robertson et al.

(10) Patent No.: US 8,974,929 B2
(45) Date of Patent: *Mar. 10, 2015

(54) HEATING SYSTEM FOR A BATTERY MODULE AND METHOD OF HEATING THE BATTERY MODULE

(75) Inventors: David C. Robertson, Chicago, IL (US); Daniel K. McNeill, Lake Orion, MI (US)

(73) Assignee: LG Chem, Ltd., Seoul (KR)

( * ) Notice: Subject to any disclaimer, the term of this patent is extended or adjusted under 35 U.S.C. 154(b) by 474 days.

This patent is subject to a terminal disclaimer.

(21) Appl. No.: 13/173,299

(22) Filed: Jun. 30, 2011

(65) Prior Publication Data

US 2013/0004805 A1 Jan. 3, 2013

(51) Int. Cl.
| | | |
|---|---|---|
| H01M 10/50 | (2006.01) | |
| H01M 10/6571 | (2014.01) | |
| H01M 10/48 | (2006.01) | |
| H01M 10/6563 | (2014.01) | |
| H01M 10/633 | (2014.01) | |

(52) U.S. Cl.
CPC ........ *H01M 10/5083* (2013.01); *H01M 10/486* (2013.01); *H01M 10/5022* (2013.01); *H01M 10/5067* (2013.01)
USPC .............................................. 429/50; 429/62

(58) Field of Classification Search
CPC ...................... H01M 10/5083; H01M 10/5067
USPC ...................................................... 429/62, 50
See application file for complete search history.

(56) References Cited

U.S. PATENT DOCUMENTS

| | | |
|---|---|---|
| 4,390,841 A | 6/1983 | Martin et al. |
| 5,578,915 A | 11/1996 | Crouch, Jr. et al. |
| 5,606,242 A | 2/1997 | Hull et al. |
| 5,644,212 A | 7/1997 | Takahashi |
| 5,652,502 A | 7/1997 | van Phuoc et al. |
| 5,658,682 A | 8/1997 | Usuda et al. |
| 5,694,335 A | 12/1997 | Hollenberg |

(Continued)

FOREIGN PATENT DOCUMENTS

| | | | |
|---|---|---|---|
| JP | 9243716 A | 9/1997 | |
| JP | 9312901 A | 12/1997 | |

(Continued)

OTHER PUBLICATIONS

International Search Report dated Jul. 25, 2005 for International Application No. PCT/KR2004/003103.

(Continued)

*Primary Examiner* — Nicholas P D'Aniello
(74) *Attorney, Agent, or Firm* — Buckert Patent & Trademark Law Firm, PC; John F. Buckert

(57) ABSTRACT

A heating system and a method for heating a battery module are provided. The method includes determining if the temperature signal indicates that the temperature level is less than a threshold temperature level. If the temperature level is less than the threshold temperature level, then the method further includes generating a first control signal to induce the switch to have the first operational position to at least partially discharge the first and second battery cell groups through a resistor to generate heat energy in the resistor. The method further includes generating a second control signal to turn on a fan to distribute the heat energy in the battery module to increase a temperature level of the battery module.

8 Claims, 3 Drawing Sheets

(56) References Cited

U.S. PATENT DOCUMENTS

| | | | |
|---|---|---|---|
| 5,701,068 | A | 12/1997 | Baer et al. |
| 5,714,866 | A | 2/1998 | S et al. |
| 5,739,670 | A | 4/1998 | Brost et al. |
| 5,796,239 | A | 8/1998 | van Phuoc et al. |
| 5,825,155 | A | 10/1998 | Ito et al. |
| 5,936,385 | A | 8/1999 | Patillon et al. |
| 6,016,047 | A | 1/2000 | Notten et al. |
| 6,064,180 | A | 5/2000 | Sullivan et al. |
| 6,160,376 | A | 12/2000 | Kumar et al. |
| 6,232,744 | B1 | 5/2001 | Kawai et al. |
| 6,285,163 | B1 | 9/2001 | Watanabe et al. |
| 6,329,823 | B2 | 12/2001 | Blessing et al. |
| 6,353,815 | B1 | 3/2002 | Vilim et al. |
| 6,359,419 | B1 | 3/2002 | Verbrugge et al. |
| 6,362,598 | B2 | 3/2002 | Laig-Horstebrock et al. |
| 6,441,586 | B1 | 8/2002 | Tate, Jr. et al. |
| 6,515,454 | B2 | 2/2003 | Schoch |
| 6,534,954 | B1 | 3/2003 | Plett |
| 6,563,318 | B2 | 5/2003 | Kawakami et al. |
| 6,583,606 | B2 | 6/2003 | Koike et al. |
| 6,608,482 | B2 | 8/2003 | Sakai et al. |
| 6,646,421 | B2 | 11/2003 | Kimura et al. |
| 6,661,201 | B2 | 12/2003 | Ueda et al. |
| 6,724,172 | B2 | 4/2004 | Koo |
| 6,829,562 | B2 | 12/2004 | Sarfert |
| 6,832,171 | B2 | 12/2004 | Barsoukov et al. |
| 6,876,175 | B2 | 4/2005 | Schoch |
| 6,892,148 | B2 | 5/2005 | Barsoukov et al. |
| 6,919,952 | B2 | 7/2005 | Kruit |
| 6,927,554 | B2 | 8/2005 | Tate, Jr. et al. |
| 6,943,528 | B2 | 9/2005 | Schoch |
| 6,967,466 | B2 | 11/2005 | Koch |
| 6,984,961 | B2 | 1/2006 | Kadouchi et al. |
| 7,012,434 | B2 | 3/2006 | Koch |
| 7,039,534 | B1 | 5/2006 | Ryno et al. |
| 7,061,246 | B2 | 6/2006 | Dougherty et al. |
| 7,072,871 | B1 | 7/2006 | Tinnemeyer |
| 7,098,665 | B2 | 8/2006 | Laig-Hoerstebrock |
| 7,109,685 | B2 | 9/2006 | Tate, Jr. et al. |
| 7,126,312 | B2 | 10/2006 | Moore |
| 7,136,762 | B2 | 11/2006 | Ono |
| 7,138,775 | B2 | 11/2006 | Sugimoto et al. |
| 7,197,487 | B2 | 3/2007 | Hansen et al. |
| 7,199,557 | B2 | 4/2007 | Anbuky et al. |
| 7,233,128 | B2 | 6/2007 | Brost et al. |
| 7,250,741 | B2 | 7/2007 | Koo et al. |
| 7,253,587 | B2 | 8/2007 | Meissner |
| 7,315,789 | B2 | 1/2008 | Plett |
| 7,317,300 | B2 | 1/2008 | Sada et al. |
| 7,321,220 | B2 | 1/2008 | Plett |
| 7,327,147 | B2 | 2/2008 | Koch |
| 7,400,115 | B2 | 7/2008 | Plett |
| 7,424,663 | B2 | 9/2008 | Mehalel |
| 7,446,504 | B2 | 11/2008 | Plett |
| 7,518,339 | B2 | 4/2009 | Schoch |
| 7,521,895 | B2 | 4/2009 | Plett |
| 7,525,285 | B2 | 4/2009 | Plett |
| 7,583,059 | B2 | 9/2009 | Cho |
| 7,589,532 | B2 | 9/2009 | Plett |
| 7,593,821 | B2 | 9/2009 | Plett |
| 7,893,694 | B2 | 2/2011 | Plett |
| 2003/0015993 | A1 | 1/2003 | Misra et al. |
| 2003/0162084 | A1 | 8/2003 | Shigeta et al. |
| 2003/0184307 | A1 | 10/2003 | Kozlowski et al. |
| 2005/0100786 | A1 | 5/2005 | Ryu et al. |
| 2005/0127874 | A1 | 6/2005 | Lim et al. |
| 2006/0100833 | A1 | 5/2006 | Plett |
| 2007/0120533 | A1 | 5/2007 | Plett |
| 2008/0094035 | A1 | 4/2008 | Plett |
| 2008/0213652 | A1* | 9/2008 | Scheucher ............ 429/62 |
| 2008/0249725 | A1 | 10/2008 | Plett |
| 2009/0327540 | A1 | 12/2009 | Robertson et al. |
| 2011/0003182 | A1* | 1/2011 | Zhu .................. 429/50 |

FOREIGN PATENT DOCUMENTS

| | | | |
|---|---|---|---|
| JP | 11003505 | A | 1/1999 |
| JP | 11023676 | A | 1/1999 |
| JP | 11032442 | A | 2/1999 |
| JP | 11038105 | A | 2/1999 |
| JP | 2002228730 | A | 8/2002 |
| JP | 2002319438 | A | 10/2002 |
| JP | 2002325373 | A | 11/2002 |
| JP | 2003516618 | A | 5/2003 |
| JP | 2003249271 | A | 9/2003 |
| JP | 2003257501 | A | 9/2003 |
| JP | 2004031014 | A | 1/2004 |
| JP | 2004521365 | A | 7/2004 |
| JP | 2006516326 | A | 6/2009 |
| JP | 2010262879 | A | 11/2010 |
| KR | 19970024432 | A | 5/1997 |
| KR | 20020026428 | A | 4/2002 |
| WO | WO0067359 | A1 | 11/2000 |

OTHER PUBLICATIONS

International Search Report dated Mar. 31, 2005 for International Application No. PCT/KR2004/003332.

International Search Report dated Dec. 1, 2006 for International Application No. PCT/KR2006/003305.

S. Moore, P. Schneider; A review of Cell Equalization Methods for Lithium Ion and Lithium Polymer Battery Systems; 2001 Society of Automotive Engineers; Jan. 2001; pp. 1-5.

G. Plett; Advances in EKF SOC Estimation for LiPB HEV Battery Packs; Powering Sustainable Transportation EVS 20; Nov. 15-19, 2003; Long Beach, CA; pp. 1-12.

G. Welch, G. Bishop; An Introduction to the Kalman Filter; SIGGRAPH 2001 Course 8; Los Angeles, CA; Aug. 12-17, 2001; http//info.acm.org/pubs/toc/CRnotice.html, pp. 1-80.

E. Wan, A. Nelson; Dual Extended Kalman Filter Methods; Kalman Filtering and Neural Networks; 2001; pp. 123-173.

Yon et al.; Dynamic Multidimensional Wavelet Neural Network and its Application; Journal of Advanced Computational Intelligence and Intelligent Informatics; 2000; vol. 4, No. 5; pp. 336-340.

Fletcher et al; Estimation from Lossy Sensor Data: Jump Linear Modeling and Kalman Filtering; IPSN Apr. 26-27, 2004; Berkeley, California; pp. 251-258.

G. Plett; Extended Kalman Filtering for Battery Managements System of LiPB-based HEV Battery Packs—Part 1 Background; Journal of Power Sources 134; 2004; pp. 252-261.

G. Plett; Extended Kalman Filtering for Battery Managements System of LiPB-based HEV Battery Packs—Part 2 Background; Journal of Power Sources 134; 2004; pp. 262-276.

G. Plett; Extended Kalman Filtering for Battery Managements System of LiPB-based HEV Battery Packs—Part 3 Background; Journal of Power Sources 134; 2004; pp. 277-283.

G. Plett; Kalman-Filter SOC Estimation for LiPB HEV Cells; The 19th International Battery, Hybrid and Fuel Electric Vehicle Symposium and Exhibition; Oct. 19-23, 2002; Busan, Korea; pp. 1-12.

G. Plett; LiPB Dynamic Cell Models for Kalman-Filter SOC Estimation; The 19th International Battery, Hybrid and Fuel Electric Vehicle Symposium and Exhibition; Oct. 19-23, 2002; Busan, Korea; pp. 1-12.

S.C. Rutan; Recursive Parameter Estimation; 1990; Journal of Chemometrics; vol. 4; pp. 103-121.

P. Maybeck; Stochastic models, estimation and control, vol. 1; 1979; Academic Press Inc., 32 pp.

T. Hansen, C.J. Wang; Support vector based battery state of charge estimator; Journal of Power Sources, 2004; 6391; pp. 1-8.

V. Johnson et al.; Temperature-Dependent Battery Models for High-Power Lithium-Ion Batteries; Jan. 2001; NREL/CP-540-28716; 17th Annual Electric Vehicle Symposium Oct. 15-18, 2000.

U.S. Appl. No. 12/819,617, filed Jun. 21, 2010 entitled Voltage Management Methods and Systems for Performing Analog-to-Digital Conversions.

(56) References Cited

OTHER PUBLICATIONS

U.S. Appl. No. 12/822,285, filed Jun. 24, 2010 entitled Battery Management System and Method for Transferring Data within the Battery Management System.

U.S. Appl. No. 12/870,940, filed Aug. 30, 2010 entitled Systems and Methods for Determining a Warranty Obligation of a Supplier to an Original Equipment Manufacturer for a Vehicle Battery Pack.

U.S. Appl. No. 13/093,187, filed Apr. 25, 2011 entitled Battery System and Method for Increasing an Operational Life of a Battery Cell.

* cited by examiner

HEATING SYSTEM FOR A BATTERY MODULE AND METHOD OF HEATING THE BATTERY MODULE

BACKGROUND

When electric vehicle batteries have relatively cold internal temperatures, an amount of electrical power that can be supplied by the batteries can be lower than a desired electrical power level.

The inventors herein have recognized a need for an improved heating system for a battery module and a method of heating the battery module to reduce and/or eliminate the above-mentioned deficiency.

SUMMARY

A heating system for a battery module in accordance with an exemplary embodiment is provided. The battery module has first and second battery cell groups. The heating system includes a resistor configured to be electrically coupled to the first and second battery cell groups when a switch has a first operational position. The heating system further includes a temperature sensor configured to generate a temperature signal indicative of a temperature level of at least one of the first battery cell group and the second battery cell group. The heating system further includes a computer configured to determine if the temperature signal indicates that the temperature level is less than a threshold temperature level. If the temperature level is less than the threshold temperature level, then the computer is further configured to generate a first control signal to induce the switch to have the first operational position to at least partially discharge the first and second battery cell groups through the resistor to generate heat energy in the resistor. The computer is further configured to generate a second control signal to turn on a fan to distribute the heat energy in the battery module to increase the temperature level of the battery module.

A method for heating a battery module in accordance with another exemplary embodiment is provided. The battery module has first and second battery cell groups. The method includes generating a temperature signal indicative of a temperature level of at least one of the first battery cell group and the second battery cell group utilizing a temperature sensor. The method further includes determining if the temperature signal indicates that the temperature level is less than a threshold temperature level utilizing a computer. If the temperature level is less than the threshold temperature level, then the method further includes generating a first control signal utilizing the computer to induce the switch to have the first operational position to at least partially discharge the first and second battery cell groups through a resistor to generate heat energy in the resistor, and generating a second control signal to turn on a fan to distribute the heat energy in the battery module to increase a temperature level of the battery module, utilizing the computer.

DETAILED DESCRIPTION

Figure 1:
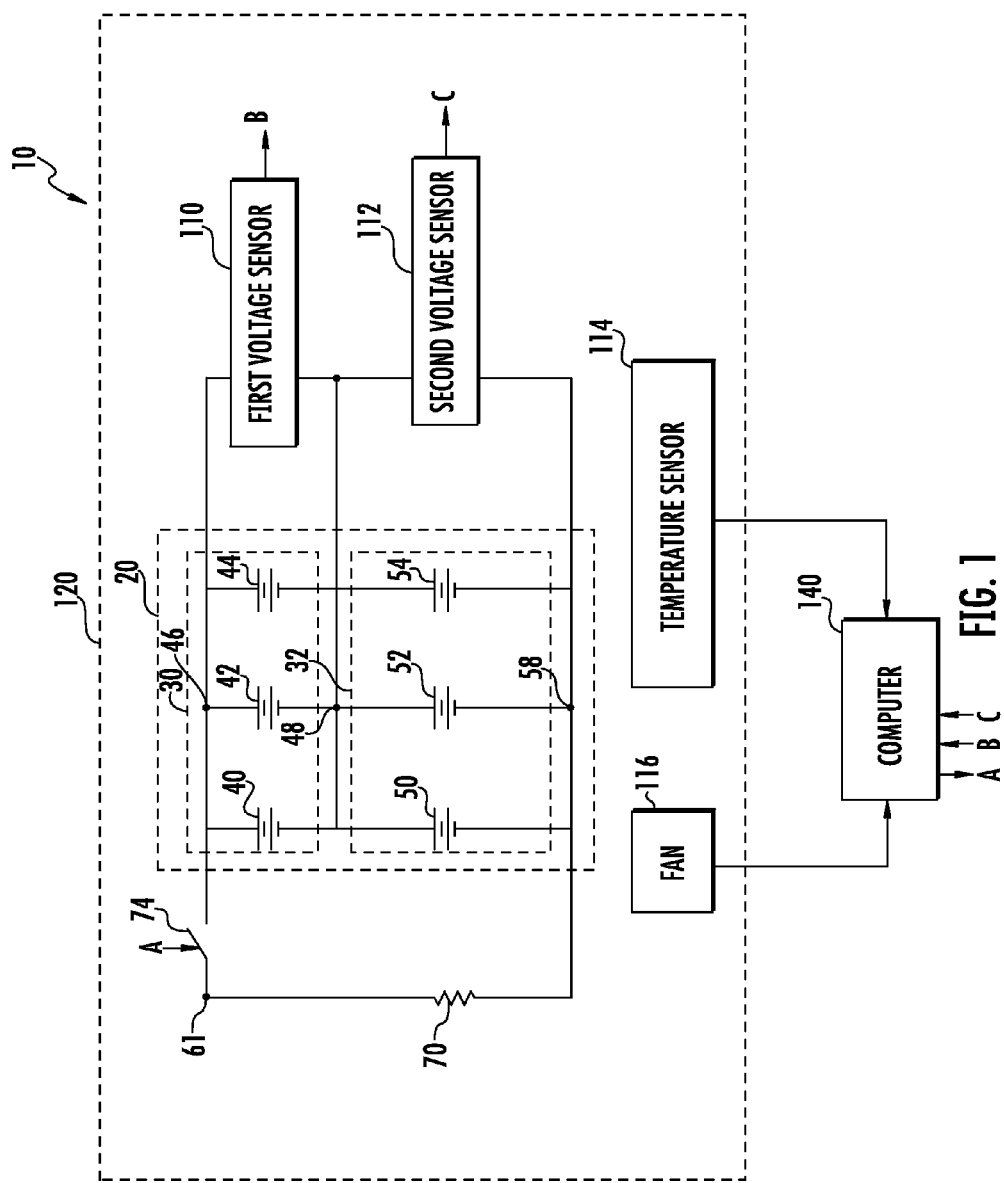
FIG. 1 is a schematic of a heating system for a battery module in accordance with an exemplary embodiment.

Referring to FIG. 1, a heating system 10 for heating a battery module 20, in accordance with an exemplary embodiment is provided. An advantage of the heating system 10 is that the system utilizes a balancing resistor for generating heat energy to increase the temperature of the battery module 20 greater than or equal to a threshold temperature level. For purposes of understanding, the term "electrically balanced" means that two or more battery cells (or two or more battery cell groups) have substantially equal output voltages or substantially equal state-of-charges. A state of charge of a battery cell group can be determined utilizing the following equation: state-of-charge=f(output voltage, temperature level of battery cell group). It should be noted that an output voltage of a battery cell group corresponds to an output voltage of a battery cell in the battery cell group. Also, a temperature level of a battery cell group corresponds to a temperature level of a battery cell in the battery cell group. The term "resistor" means one or more electrical components that dissipate electrical power through an internal impedance. For example, a resistor could comprise at least one of a carbon-based electrically resistive component, a wire-bound electrically resistive component, and a heating coil.

The battery module 20 includes a first battery cell group 30 and a second battery cell group 32. The first battery cell group 30 includes battery cells 40, 42, 44 that are electrically coupled in parallel to one another between nodes 46 and 48. In an alternative embodiment, the first battery cell group 30 could have less than three battery cells or greater than three battery cells electrically coupled in parallel therein. In one exemplary embodiment, the battery cells 40, 42, 44 are lithium-ion pouch type battery cells. Of course, in an alternative embodiment, the battery cells 40, 42, 44 could be other types of battery cells known to those skilled in the art.

The second battery cell group 32 includes battery cells 50, 52, 54 that are electrically coupled in parallel to one another between nodes 48, 58. In an alternative embodiment, the second battery cell group 32 could have less than three battery cells or greater than three battery cells electrically coupled in parallel therein. In one exemplary embodiment, the battery cells 50, 52, 54 are lithium-ion pouch-type battery cells. Of course, in an alternative embodiment, the battery cells 50, 52, 54 could be other types of battery cells known to those skilled in the art.

The heating system 10 is provided to increase a temperature level of the battery module 20 within the housing 120 when the temperature level falls below a threshold temperature level. The heating system 10 includes a resistor 70, a switch 74, a first voltage sensor 110, a second voltage sensor 112, a temperature sensor 114, a fan 116, a housing 120, and a computer 140.

The resistor 70 is electrically coupled between nodes 58, 61. The switch 74 is electrically coupled between the nodes 61, 46. The resistance value of the resistor 70 is determined based on a function of the combined energy capacity (e.g., amperage-hours) of the first and second battery cell groups 30, 32.

When the switch 74 has a first operational position (e.g., a closed operational position) in response to a respective control signal from the computer 140, then the first and second battery cell groups 30, 32 generate an electrical current that flows through the resistor 70 to generate heat energy therein to increase a temperature level of the battery module 20 and to at least partially discharge the first and second battery cell groups 30, 32. Also, when the switch 74 has a second operational position (e.g., an open operational position) in response to the respective control signal no longer being supplied by the computer 140, the electrical current from the first and second battery cell groups 30, 32 no longer flows through the resistor 70.

The first voltage sensor 110 is electrically coupled between the nodes 46, 48. The first voltage sensor 110 is configured to generate a first signal indicative of a first voltage level being output by the first battery cell group 30, that is received by the computer 140.

The second voltage sensor 112 is electrically coupled between the nodes 48, 58. The second voltage sensor 112 is configured to generate a second signal indicative of a second voltage level being output by the second battery cell group 32, that is received by the computer 140.

The temperature sensor 114 is disposed proximate to at least one of the first and second battery cell groups 30, 32. The temperature sensor 114 is configured to generate a temperature signal indicative of a temperature level of at least one of the first battery cell group 30 and the second battery cell group 32 that is received by the computer 140.

The fan 116 is disposed proximate to the resistor 70. The fan 116 is configured to circulate air or another gas past the resistor 70 when the fan 116 is turned on to distribute heat energy from the resistor 70 to the battery module 34 to increase a temperature level of the battery cells therein. The fan 116 is turned on by a control signal from the computer 140 and is turned off when the control signal is no longer supplied to the fan 116 by the computer 140.

The housing 120 is provided to enclose the resistor 70, the switch 74, the first voltage sensor 110, the second voltage sensor 112, the temperature sensor 114, and the fan 116. In one exemplary embodiment, the computer 140 is disposed outside of the housing 120. Of course, in an alternative embodiment, the computer 140 is disposed inside of the housing 120. In one exemplary embodiment, the housing 120 may be constructed of plastic. Of course, in an alternative embodiment, the housing 120 could be constructed of other materials known to those skilled in the art, such as stainless steel for example.

The computer 140 is electrically coupled to the switch 74, the first voltage sensor 110, the second voltage sensor 112, the temperature sensor 114, and the fan 116. The computer 140 has an internal memory device for storing executable software instructions and associated data for implementing the methods for heating the battery module 20 that will be explained in greater detail below. In one exemplary embodiment, the computer 140 comprises a microprocessor operably coupled to a memory device. Of course, in alternative embodiments, the computer 140 could comprise a programmable logic controller or a field programmable logic array.

Figure 2:
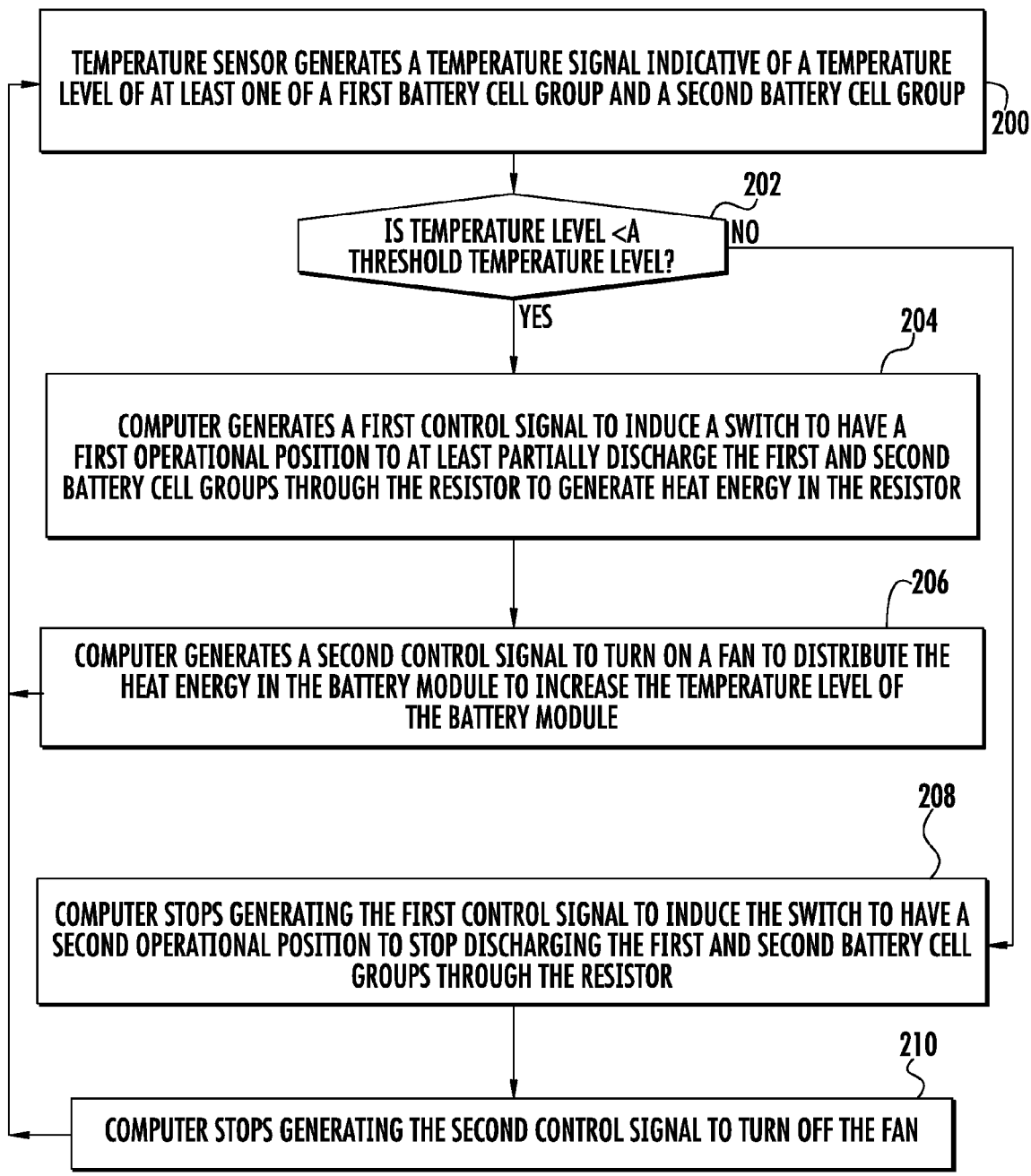
FIG. 2 is a flowchart of a method for heating the battery module in accordance with another exemplary embodiment.

Referring to FIG. 2, a method for heating the battery module 20 in accordance with an exemplary embodiment will now be explained.

At step 200, the temperature sensor 114 generates a temperature signal indicative of a temperature level of at least one of the first battery cell group 30 and the second battery cell group 32. After step 200, the method advances to step 202.

At step 202, the computer 140 makes a determination as to whether the temperature level is less than a threshold temperature level based on the temperature signal. In an exemplary embodiment, the threshold temperature level is within a temperature range of 0-10° C. In another exemplary embodiment, the threshold temperature level is 10° C. Of course, the threshold temperature level could be less than 0° C. or greater than 10° C. If the value of step 202 equals "yes", the method advances to step 204. Otherwise, the method advances to step 208.

At step 204, the computer 140 generates a first control signal to induce the switch 74 to have a first operational position to at least partially discharge the first and second battery cell groups 30, 32 through the resistor 70 to generate heat energy in the resistor 70. After step 204, the method advances to step 206.

At step 206, the computer 140 generates a second control signal to turn on the fan 116 to distribute the heat energy in the battery module 20 to increase the temperature level of the battery module 20. After step 206, the method returns to step 200.

Referring again to step 202, if the value of step 202 equals "no", the method advances to step 208. At step 208, the computer 140 stops generating the first control signal to induce the switch 74 to have a second operational position to stop discharging the first and second battery cell groups 30, 32 through the resistor 70. After step 208, the method advances to step 210.

At step 210, computer 140 stops generating the second control signal to turn off the fan 116. After step 210, the method returns to step 200.

Figure 3:
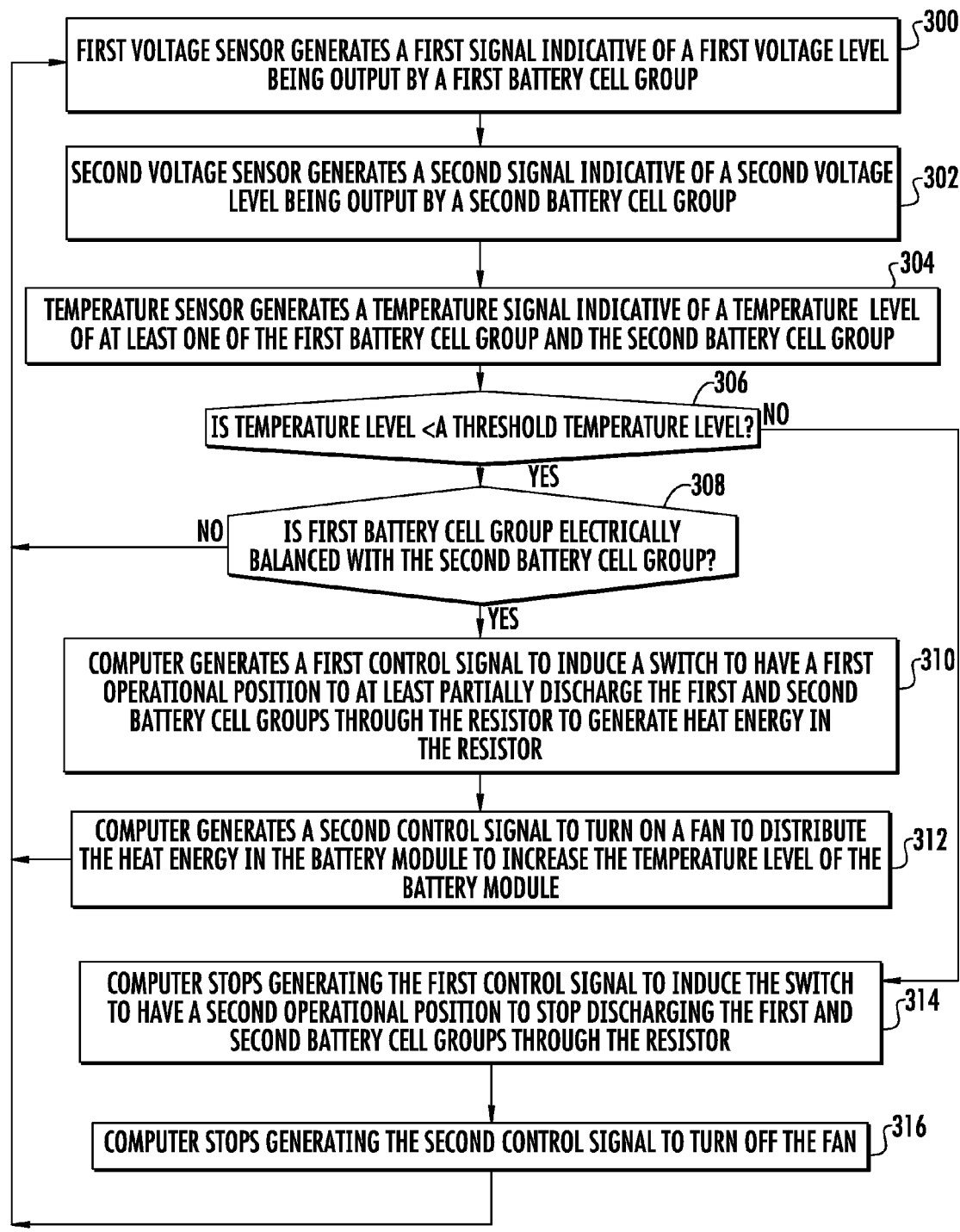
FIG. 3 is a flowchart of a method for heating the battery module in accordance with another exemplary embodiment.

Referring to FIG. 3, a method for heating the battery module 20 in accordance with another exemplary embodiment will now be explained.

At step 300, the first voltage sensor 110 generates a first signal indicative of a first voltage level being output by the first battery cell group 30. After step 300, the method advances to step 302.

At step 302, the second voltage sensor 112 generates a second signal indicative of a second voltage level being output by the second battery cell group 32. After step 302, the method advances to step 304.

At step 304, the temperature sensor 114 generates a temperature signal indicative of a temperature level of at least one of the first battery cell group 30 and the second battery cell group 32. After step 304, the method advances to step 306.

At step 306, the computer 140 makes a determination as to whether the temperature level is less than a threshold temperature level based on the first and second signals. In an exemplary embodiment, the threshold temperature level is within a temperature range of 0-10° C. In another exemplary embodiment, the threshold temperature level is 10° C. If the value of step 306 equals "yes", the method advances step 308. Otherwise, the method advances to step 314.

At step 308, the computer 140 makes a determination as to whether the first battery cell group 30 is electrically balanced with the second battery cell group 32. If the value of step 308 equals "yes", the method advances to step 310. Otherwise, the method returns to step 300.

At step 310, the computer 140 generates a first control signal to induce the switch 74 to have a first operational position to at least partially discharge the first and second battery cell groups 30, 32 through the resistor 70 to generate heat energy in the resistor 70. After step 310, the method advances to step 312.

At step 312, the computer 140 generates a second control signal to turn on the fan 116 to distribute the heat energy in the battery module 20 to increase the temperature level of the battery module 20. After step 312, the method returns to step 300.

Referring again to step 306, if the value of step 306 equals "no", the method advances to step 314. At step 314, computer 140 stops generating the first control signal to induce the switch 70 to have a second operational position to stop discharging the first and second battery cell groups 30, 32 through the resistor 70. After step 314, the method advances to step 316.

At step 316, computer 140 stops generating the second control signal to turn off the fan 116. After step 316, the method returns to step 300.

The heating system 10 for the battery module 20 and the method for heating the battery module 20 provide a substantial advantage over other heating systems and methods. In particular, the heating system 10 and method utilize a balancing resistor in the heating system for generating heat energy to increase the temperature of the battery module 20 greater than or equal to a threshold temperature level.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A heating system for a battery module, the battery module having first and second battery cell groups, comprising:
    a temperature sensor configured to generate a temperature signal indicative of a temperature level of at least one of the first battery cell group and the second battery cell group;
    a first voltage sensor being coupled to first and second nodes of the first battery cell group, the first battery cell group having a first battery cell and a second battery cell, the first battery cell having a first positive terminal and a first negative terminal, the second battery cell having a second positive terminal and a second negative terminal, the first and second positive terminals being coupled to the first node, the first and second negative terminals being coupled to the second node, the first voltage sensor configured to generate a first signal indicative of a first voltage level of the first battery cell group between the first and second nodes;
    a second voltage sensor being coupled to the second node and a third node of the second battery cell group, the second battery cell group having a third battery cell and a fourth battery cell, the third battery cell having a third positive terminal and a third negative terminal, the fourth battery cell having a fourth positive terminal and a fourth negative terminal, the third and fourth positive terminals being coupled to the second node, the third and fourth negative terminals being coupled to the third node, the second voltage sensor configured to generate a second signal indicative of a second voltage level of the second battery cell group between the second and third nodes;
    a series combination of a switch and a resistor being electrically coupled in series between the first node and the third node, the resistor being electrically coupled in parallel to a series combination of the first battery cell group and the second battery cell group when the switch has a first operational position;
    a computer programmed to determine if the temperature signal indicates that the temperature level is less than a threshold temperature level;
    the computer further programmed to determine if the first voltage level is substantially equal to the second voltage level;
    the computer further programmed to generate a first control signal to induce the switch to have the first operational position to at least partially discharge the first and second battery cell groups through the resistor to generate heat energy in the resistor, if both the temperature level is less than the threshold temperature level, and the first voltage level is substantially equal to the second voltage level; and
    the computer further programmed to generate a second control signal to turn on a fan to distribute the heat energy in the battery module to increase the temperature level of the battery module.

2. The heating system of claim 1, wherein
    the computer further programmed to stop generating the first control signal to induce the switch to have a second operational position to stop discharging the first and second battery cell groups through the resistor, if the temperature signal indicates that the temperature level is greater than or equal to the threshold temperature level; and
    the computer further programmed to stop generating the second control signal to turn off the fan, if the temperature signal indicates that the temperature level is greater than or equal to the threshold temperature level.

3. The heating system of claim 1, wherein the computer is further programmed to stop generating the second control signal to turn off the fan, if the temperature level is greater than or equal to the threshold temperature level.

4. The heating system of claim 1, further comprising:
    a housing enclosing the resistor, the temperature sensor, the first and second voltage sensors, and the switch therein; and
    the computer being disposed outside of the housing.

5. A heating system for a battery module, the battery module having first and second battery cell groups, comprising:
    a temperature sensor configured to generate a temperature signal indicative of a temperature level of at least one of the first battery cell group and the second battery cell group;
    a first voltage sensor being coupled to first and second nodes of the first battery cell group, the first battery cell group having a first battery cell and a second battery cell, the first battery cell having a first positive terminal and a first negative terminal, the second battery cell having a second positive terminal and a second negative terminal, the first and second positive terminals being coupled to the first node, the first and second negative terminals being coupled to the second node, the first voltage sensor configured to generate a first signal indicative of a first voltage level of the first battery cell group between the first and second nodes;
    a second voltage sensor being coupled to the second node and a third node of the second battery cell group, the second battery cell group having a third battery cell and a fourth battery cell, the third battery cell having a third positive terminal and a third negative terminal, the fourth battery cell having a fourth positive terminal and a fourth negative terminal, the third and fourth positive terminals being coupled to the second node, the third and fourth negative terminals being coupled to the third node, the second voltage sensor configured to generate a second signal indicative of a second voltage level of the second battery cell group between the second and third nodes;
    a series combination of a switch and a resistor being electrically coupled in series between the first node and the third node, the resistor being electrically coupled in parallel to a series combination of the first battery cell group and the second battery cell group when the switch has a first operational position;

a computer programmed to determine if the temperature signal indicates that the temperature level is less than a threshold temperature level;

the computer further programmed to determine if the first battery cell group is electrically balanced with the second battery cell group based on first and second signals, respectively, from first and second voltage sensors, respectively the computer further programmed to generate a first control signal to induce the switch to have the first operational position to at least partially discharge the first and second battery cell groups through the resistor to generate heat energy in the resistor, if both the temperature level is less than the threshold temperature level, and the first battery cell group is electrically balanced with the second battery cell group; and the computer further programmed to generate a second control signal to turn on a fan to distribute the heat energy in the battery module to increase the temperature level of the battery module.

6. The heating system of claim 5, wherein:

the computer further programmed to stop generating the first control signal to induce the switch to have a second operational position to stop discharging the first and second battery cell groups through the resistor, if the temperature signal indicates that the temperature level is greater than or equal to the threshold temperature level; and the computer further programmed to stop generating the second control signal to turn off the fan, if the temperature signal indicates that the temperature level is greater than or equal to the threshold temperature level.

7. The heating system of claim 6, wherein the computer is further programmed to stop generating the second control signal to turn off the fan, if the temperature level is greater than or equal to the threshold temperature level.

8. The heating system of claim 5, further comprising:

a housing enclosing the resistor, the temperature sensor, the first and second voltage sensors, and the switch therein; and the computer being disposed outside of the housing.

* * * * *